US009036201B2

(12) United States Patent
Hagiwara

(10) Patent No.: US 9,036,201 B2
(45) Date of Patent: May 19, 2015

(54) PRINTING MEDIA RECYCLING APPARATUS AND PRINTING MEDIA RECYCLING METHOD

(75) Inventor: Takahiro Hagiwara, Chiba-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 483 days.

(21) Appl. No.: 13/351,576

(22) Filed: Jan. 17, 2012

(65) Prior Publication Data

US 2012/0189340 A1 Jul. 26, 2012

Related U.S. Application Data

(60) Provisional application No. 61/434,911, filed on Jan. 21, 2011.

(51) Int. Cl.
*G06K 15/02* (2006.01)
*B41J 2/32* (2006.01)

(52) U.S. Cl.
CPC ................ *B41J 2/32* (2013.01); *B41J 2202/37* (2013.01)

(58) Field of Classification Search
CPC .... H04L 29/06; G06K 15/02; G06K 15/4065; G06K 15/1822; G06K 15/1825; G06K 15/186; B41J 13/009; B41J 2202/37; B41J 2/32; G03G 15/6585; G03G 15/6588; G03G 21/00; G06F 3/1219; G06F 3/1238; G06F 3/1257; G06F 3/1261
USPC .................................... 358/1.15; 399/82, 341
See application file for complete search history.

(56) References Cited

U.S. PATENT DOCUMENTS

| | | | | |
|---|---|---|---|---|
| 5,545,381 | A | 8/1996 | Iida et al. | |
| 2007/0167324 | A1* | 7/2007 | Juang | 503/200 |

(Continued)

FOREIGN PATENT DOCUMENTS

| | | |
|---|---|---|
| CN | 101456280 | 6/2009 |
| EP | 2247091 | 11/2010 |
| JP | 05-002356 | 1/1993 |
| JP | 2003-145883 | 5/2003 |

OTHER PUBLICATIONS

Office Action for Chinese Patent Application No. 201210009153.3 Dated Feb. 8, 2014, 29 pgs.

(Continued)

*Primary Examiner* — King Poon
*Assistant Examiner* — Iriana Cruz
(74) *Attorney, Agent, or Firm* — Amin, Turocy & Watson, LLP

(57) ABSTRACT

According to one embodiment, a printing media recycling apparatus includes a printing-medium feeding section, a scanner section configured to read an image of printing medium and generate image data, the decoloring section configured to decolor an image formed of a decolorable recording material on the printing medium, a decoloring-process-ing-execution determining section configured to determine whether the execution of decoloring processing is appropriate for the printing medium or the execution of the decoloring processing is unnecessary based on the image data generated in the scanner section, a decoloring determining section configured to determine a decolored state of the printing medium after the execution of the decoloring processing by the decoloring section, and a diverting-section-switching control section configured to switch a diverting section to lead the printing medium to a predetermined discharge tray.

18 Claims, 7 Drawing Sheets

(56) References Cited

U.S. PATENT DOCUMENTS

| | | | | |
|---|---|---|---|---|
| 2011/0305851 | A1* | 12/2011 | Wang et al. | 428/32.31 |
| 2012/0038732 | A1* | 2/2012 | Iguchi et al. | 347/179 |

OTHER PUBLICATIONS

Chinese Office Action for Chinese Patent Application No. 201210009153.3 mailed Jul. 23, 2014.

* cited by examiner

PRINTING MEDIA RECYCLING APPARATUS AND PRINTING MEDIA RECYCLING METHOD

CROSS-REFERENCE TO RELATED APPLICATION

This application is based upon and claims the benefit of U.S. Provisional Application No. 61/434,911, filed on Jan. 21, 2011.

FIELD

Embodiments described herein relate generally to a printing media recycling apparatus and a printing media recycling method for recycling a reusable printing medium.

BACKGROUND

In the past, there is known a recycling and storing apparatus for reversible thermosensitive recording media that erases, in order to reuse reversible thermosensitive recording media on which characters and images can be written and erased using heat, recorded characters and images, sorts the recording media according to sizes, and stores the recording media. However, this apparatus applies recycling processing even to reversible photosensitive recording media in a white paper state on which characters and images are not recorded. Therefore, since the reversible thermosensitive recording media are unnecessarily heated, the recording media are deteriorated and energy consumption is wasted.

DETAILED DESCRIPTION

In general, according to one embodiment, a printing media recycling apparatus includes a printing-medium feeding section, a scanner section, a decoloring section, a decoloring-processing-execution determining section, a decoloring determining section, and a diverting-section-switching control section. The printing-medium feeding section feeds a recycling target printing medium to a conveying path. The scanner section reads an image of the fed printing medium and generates image data. The decoloring section decolors an image formed of a decolorable recording material on the printing medium. The decoloring-processing-execution determining section determines, on the basis of the image data generated by the scanner section, whether the execution of decoloring processing is appropriate for the printing medium or the execution of the decoloring processing is unnecessary. The decoloring determining section determines a decolored state of the printing medium after the execution of the decoloring processing by the decoloring section. The diverting-section-switching control section switches, according to a result of the determination, a diverting section to lead the printing medium to a predetermined discharge tray.

First Embodiment

Figure 1:
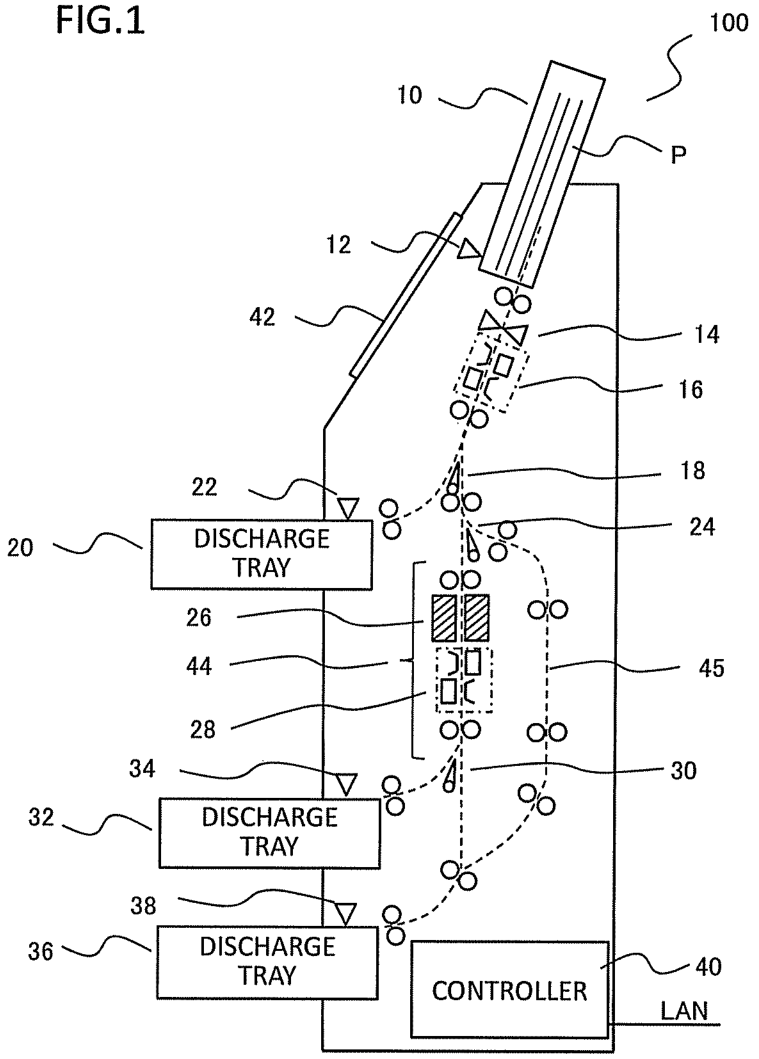
FIG. 1 is a sectional view of the structure of a printing media recycling apparatus according to an embodiment.

FIG. 1 is a sectional view of the structure of a printing media recycling apparatus according to a first embodiment. The printing media recycling apparatus is an apparatus that decolors a printing medium printed with decolorable toner or ink by heating the printing medium and recycles the printing medium as a reusable printing medium.

A printing media recycling apparatus 100 includes a feeding tray 10, discharge trays 20, 32, and 36, first and second scanners 16 and 28, a heating decolorizer 26, a controller 40, and an operation panel 42.

The feeding tray 10 stores used printing media P to be subjected to decoloring processing. The used printing media P are recording paper printed with a recording material such as decolorable toner or ink. Besides, white recording paper doubly fed by mistake in printing could be mixed in the used printing media P. Further, recording paper printed using an undecolorable recording material, recording paper on which writing is added with a pen or a marker later, and recording paper repeatedly subjected to the decoloring processing plural times could be mixed in the used printing media P. These recording papers are hereinafter collectively referred to as printing media unsuitable for recycling.

The used printing medium P determined as unsuitable for recycling is discharged to the discharge tray 20. The used printing medium P determined as unsuitable for reuse after being subjected to the decoloring processing because, for example, decoloring is insufficient as explained later is discharged to the discharge tray 32. An unused printing medium explained later or a used printing medium determined as reusable after being subjected to the decoloring processing is discharged to the discharge tray 36.

Conveying paths are formed from the feeding tray 10 to the discharge trays 20, 32, and 36. Distances from the feeding tray 10 to the discharge trays 20, 32, and 36 are set such that the conveying path to the discharge tray 20 is the shortest, the conveying path to the discharge tray 32 is the second shortest, and the conveying path to the discharge tray 36 is the longest. The conveying path from the feeding tray 10 to the discharge tray 20 is provided substantially linearly. To the feeding tray 10 and the discharge trays 20, 32, and 36, sensors 12, 22, 34, and 38 for detecting that printing media stored in the trays exceed specified amounts are respectively attached.

The used printing media P set in the feeding tray 10 are fed to a conveying path in the printing media recycling apparatus 100 one by one by a not-shown motor. Diverting sections 18, 24, and 30 arranged on the conveying path are switched according to a determination result explained later to respectively discharge the used printing media P fed to the conveying path to the discharge trays. A thickness detection sensor 14 for measuring the thickness of the printing media P is provided right behind the feeding tray 10 and upstream on the conveying path.

In a conveying path 44 provided between the diverting sections 24 and 30, the heating decolorizer 26 that heats the used printing media P to temperature equal to or higher than fixed temperature to decolor decolorable toner and ink is arranged. The first scanner 16 and the second scanner 28 are respectively arranged in the front and rear of the heating decolorizer 26. States of the printing media P before and after the decoloring processing is performed can be optically read. A conveying path 45 bypassing the heating decolorizer 26 is provided separately from the conveying path 44 passing through the heating decolorizer 26.

In the printing media recycling apparatus 100, the operation panel 42 is provided on the front surface in an upper part of a main body. A touch panel with which a user operates the printing media recycling apparatus 100 and a display that displays a state of the apparatus are integrally formed in the operation panel 42. The controller 40 that controls the entire apparatus is arranged on the inside of the main body.

Figure 2:
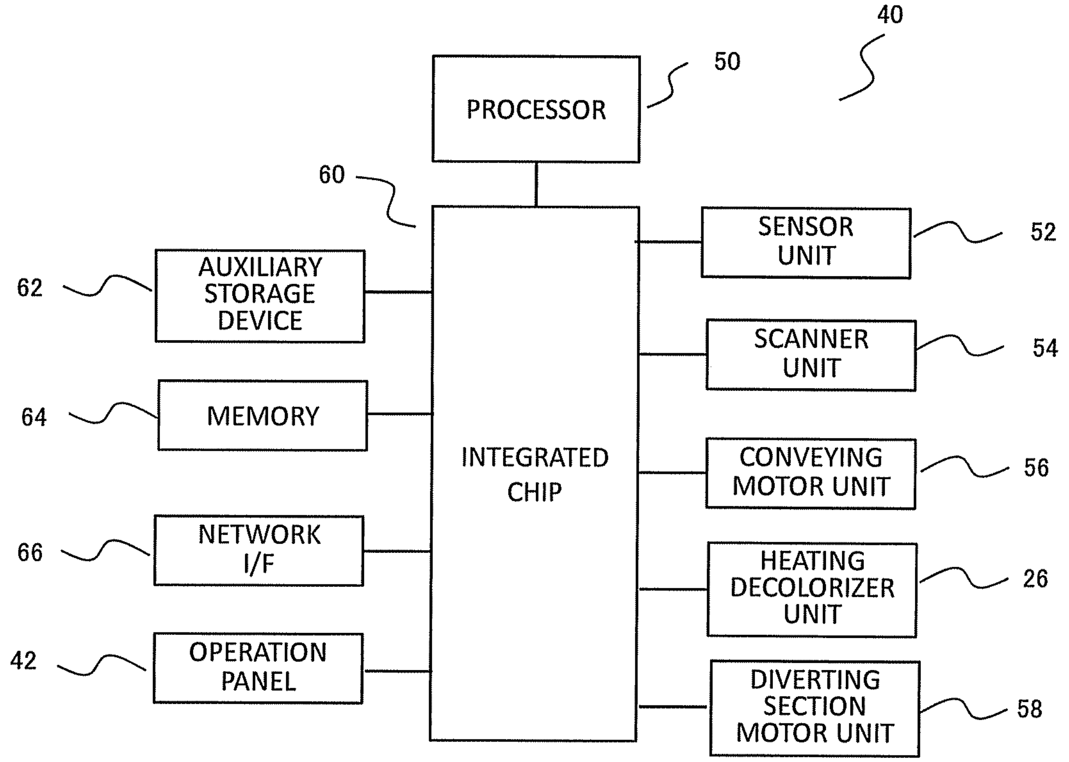
FIG. 2 is a block diagram of a controller of the printing media recycling apparatus.

FIG. 2 is a block diagram of the controller 40 of the printing media recycling apparatus 100 shown in FIG. 1. In FIG. 2, sections same as those shown in FIG. 1 are denoted by the same reference numerals. As shown in FIG. 2, the controller 40 includes a sensor unit 52, a scanner unit 54, a conveying motor unit 56, a heating decolorizer unit 26, a diverting section motor unit 58, an auxiliary storage device 62, a memory 64, the operation panel 42, a network I/F 66, an integrated chip 60 that manages interface among these units, and a processor 50.

The sensor unit 52 includes the sensors 12, 22, 34, and 38 provided in the discharge trays 20, 32, and 36 to detect that the printing media P are fully stored and the sensor 14 arranged in the conveying path to measure the thickness of the printing media P. A signal detected by the sensor unit 52 is sent to the processor 50. The structure of these sensors may be a mechanical sensor or may be an optical sensor. The scanner unit 54 includes the first scanner 16 and the second scanner 28. The first and second scanners 16 and 28 are optical color line sensors respectively arranged on both sides of the conveying paths. The same devices are used in the first and second scanners 16 and 28. However, a line sensor having lower resolution or a black and white line sensor can be used in the second scanner 28. The scanner unit 54 reads images on both sides of the printing medium P conveyed on the conveying path and outputs image data to the processor 50. The conveying motor unit 56 includes a motor and a driving mechanism not shown in the figure. The conveying motor unit 56 feeds the printing media P set in the feeding tray 10, conveys the printing media P, and discharges the printing media P to the discharge trays. The heating decolorizer unit 26 heats, with two heaters respectively arranged on both sides of the conveying path, both sides of the printing medium P fed from the feeding tray 10 to predetermined temperature to perform the decoloring processing. The diverting section motor unit 58 includes the diverting sections 18, 24, and 30 and a not-shown driving mechanism and performs switching of the conveying path.

The auxiliary storage device 62 stores a control program, an image processing program, and various data and parameters in advance. The memory 64 is used as a memory on which the programs are expanded and a work area. The processor 50 controls the entire printing media recycling apparatus 100 in cooperation with the auxiliary storage device 62 and the memory 64.

The operation panel 42 receives operation from the user and displays a state of the apparatus. When the printing media recycling apparatus 100 is used as a system, the network I/F 66 performs communication between the printing media recycling apparatus 100 and a PC, a server, an image forming apparatus, and the like on the outside.

Figure 3:
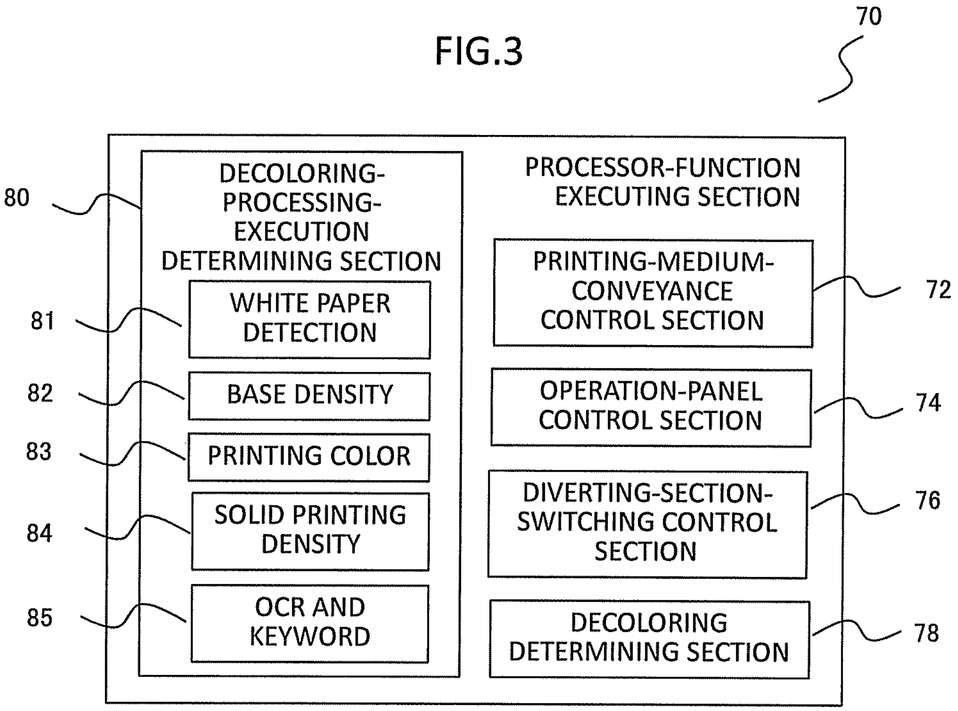
FIG. 3 is a functional block diagram of a processor of the printing media recycling apparatus.
Figure 4A:
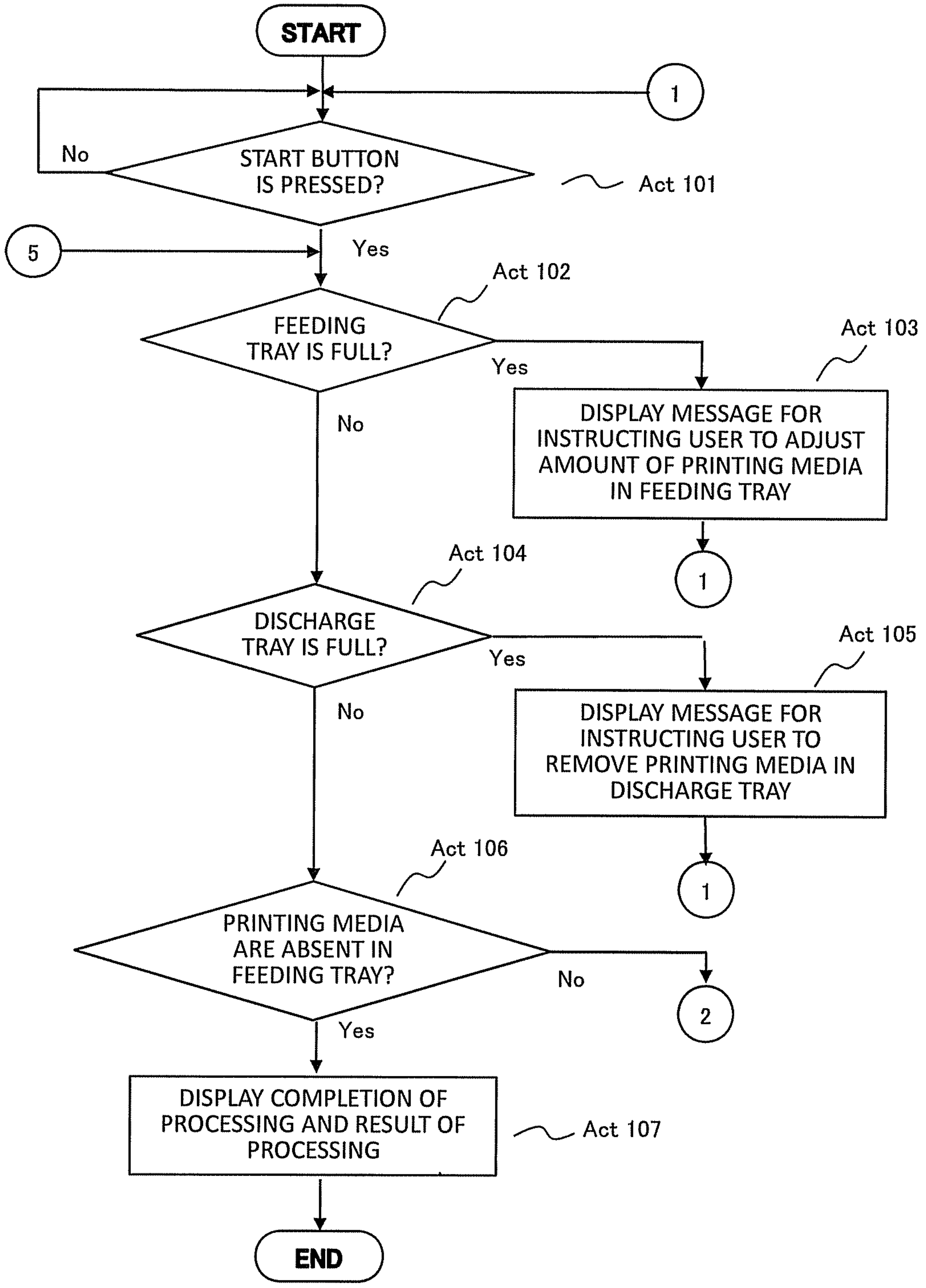
FIGS. 4A to 4C are flowcharts for explaining a control flow of the printing media recycling apparatus.
Figure 4B:
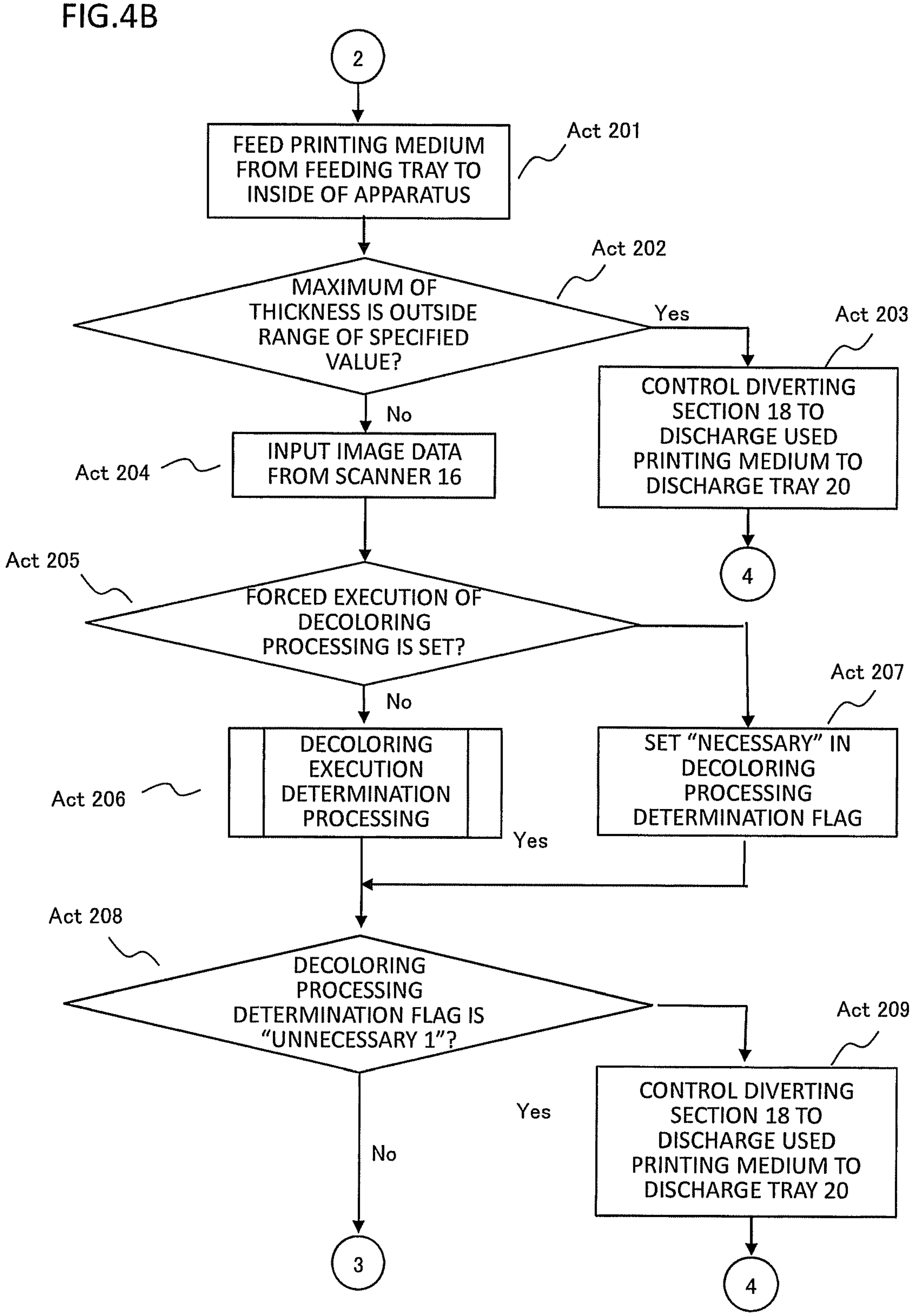
Figure 4C:
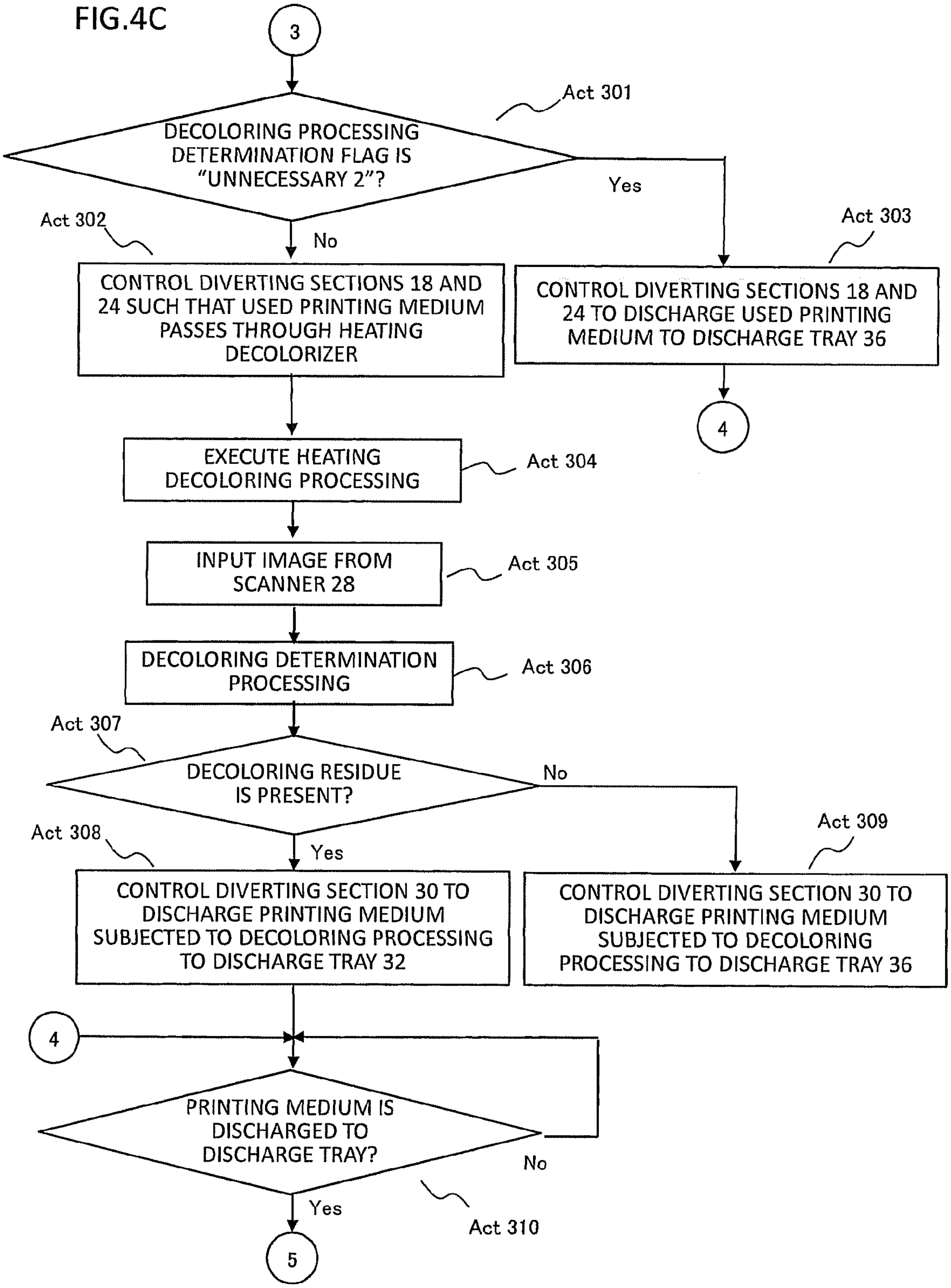

FIG. 3 is a block diagram of a function executing section 70 realized by the processor 50 executing the control program stored in the auxiliary storage device 62. The function executing section 70 includes a printing-medium-conveyance control section 72, an operation-panel control section 74, a diverting-section-switching control section 76, a decoloring determining section 78, and a decoloring-processing-execution determining section 80. The printing-medium-conveyance control section 72 controls timing for feeding and conveyance of the printing media P. The operation-panel control section 74 controls display of a state of the apparatus and a message and reception of user operation. The diverting-section-switching control section 76 controls a switching action for the diverting sections 18, 24, and 30. The decoloring determining section 78 reads, with the second scanner 28, the used printing medium P after being subjected to the decoloring processing by the heating decolorizer unit 26, counts pixels exceeding a fixed density level threshold among input read pixels, and determines a state of decoloring, i.e., presence or absence of a decoloring residue based on a count value. The user may arbitrarily set, from the operation panel 42, a density threshold for determining an allowable limit of the decoloring residue.

The decoloring-processing-execution determining section 80 analyzes data of an image of the printing medium P read by the first scanner 16 before the decoloring processing by the heating decolorizer unit 26 is executed and determines propriety of subsequent execution of the decoloring processing, i.e., whether the printing medium P is suitable for recycling. Specific determination processing includes white paper detection processing 81, base density detection processing 82, printing color detection processing 83, solid printing density detection processing 84, and OCR and keyword extraction processing 85.

The white paper detection processing 81 is processing for identifying whether the used printing medium P is white paper. The decoloring-processing-execution determining section 80 counts pixels exceeding a fixed density level threshold among read pixels input from the first scanner 16 and, if a count value is smaller than a predetermined value, determines that the used printing medium P is white paper.

The base density detection processing 82 is processing for detecting the density of a base color of the used printing medium P. However, since discoloration of the printing medium P occurs if the printing medium P is repeatedly subjected to the decoloring processing using the heating decolorizer 26, there is a limit in the number of times of the decoloring processing. Therefore, the decoloring-processing-execution determining section 80 can determine whether the decoloring processing is possible by detecting the density of the base color of the printing medium P. This processing is performed by calculating, on the basis of color image data R, G, and B input from the first scanner 16, a density distribution of the base color of the used printing medium P and calculating a base density level on the basis of a result of the calculation.

The printing color detection processing 83 is processing for detecting, after printing with a decolorable recording material, a color of ink when writing is added with an undecolorable pen, marker, or the like and is processing for identifying the printing media P printed with the undecolorable recording materials. The decoloring-processing-execution determining section 80 acquires chroma, brightness, and a hue from the color image data R, G, and B of a printed portion input from the first scanner 16, calculates color values for colors from ratios of the colors, and outputs the color values as color information. The decoloring-processing-execution determining section 80 calculate a color difference between a color value registered in advance as a color value of a decolorable recording material and a color value obtained by actual measurement and checks whether the color difference is within a predetermined range. If a thin line is treated, for example, if writing is added with a pen, a correct value can be measured by using a center portion excluding edge portions of an image.

The solid printing density detection processing 84 is processing for checking the density of a predetermined area in a portion not subjected to half-tone processing of a recording material such as toner or ink used for printing and checking a difference between the density and the density of a recording material decolorable in the recycling apparatus. The decoloring-processing-execution determining section 80 checks whether a difference between both density values is within a predetermined range. This processing can be used for identifying whether toner or ink used for printing is formed of a decolorable recording material.

The OCR and keyword extraction processing 85 is processing for applying OCR processing to an image obtained by reading the used printing medium P with the first scanner 16 and extracting the image as a keyword. It is separately determined whether a keyword coinciding with a predetermined keyword is present on the used printing medium P. It is possible to discriminate a document unsuitable for recycling of a printing medium such as a confidential document.

The operation of the printing media recycling apparatus 100 according to this embodiment is explained with reference to flowcharts of FIGS. 4A, 4B, and 4C and FIG. 5.

First, the user sets the used printing media P, which the user desires to subject to recycling processing, in the feeding tray 10. In setting the used printing media P, the user can perform authentication processing according to necessity. In the execution of the decoloring processing, the user sets, on the operation panel 42, whether an image of a printing medium to be decolored is stored, an allowable limit of a decoloring residue for a reusable printing medium, presence or absence of forced execution of heating decoloring processing, measures taken when an error occurs, and the like. After completing the setting, the user presses a start button of the operation panel 42 to start processing of the printing media recycling apparatus 100.

As explained above, besides recording paper printed with a recording material such as decolorable toner or ink, white recording paper doubly fed by mistake in printing could be mixed in the used printing media P. Further, recording paper printed using an undecolorable recording material, recording paper on which writing is added with a pen or a marker later, and recording paper repeatedly subjected to the decoloring processing plural times could be mixed in the used printing media P.

If the processor 50 detects that the not-shown start button of the operation panel 42 is pressed (Act 101), the processor 50 detects a signal of the sensor 12 and checks whether the printing media P exceeding the specified amount are set in the feeding tray 10 (Act 102). If the processor 50 determines that printing media P exceeding the specified amount are set, the operation-panel control section 74 causes the operation panel 42 to display a message for instructing the user to reduce the printing media P set in the feeding tray 10 to an appropriate amount (Act 103). If the printing media P are equal to or fewer than the specified amount (No in Act 102), subsequently, the processor 50 checks whether the discharge trays 20, 32, and 36 are full using the sensors 22, 34, and 38 (Act 104). If the discharge tray filled with printing media is present, the operation-panel control section 74 displays, on the operation panel 42, a message for instructing the user to remove the printing media from the discharge tray filled with the printing media (Act 105).

If the processor 50 determines that the discharge trays are not filled with the printing media (No in Act 104), subsequently, the processor 50 checks whether the used printing media P that should be processed are absent in the feeding tray 10 (Act 106). If the processor 50 determines that the printing media P that should be processed are absent in the feeding tray 10 (Yes in Act 106), the operation-panel control section 74 displays completion of the decoloring processing and a result of the decoloring processing on the operation panel 42 (Act 107) and ends a series of the decoloring processing.

If the processor 50 determines in Act 106 that the used printing media P that should be processed are present in the feeding tray 10 (No in Act 106), the printing-medium-conveyance control sect ion 72 drives a not-shown conveying motor and conveys the used printing medium P set in the feeding tray 10 to the inside of the printing media recycling apparatus 100 (Act 201).

First, the thickness detection sensor 14 measures the thickness of the used printing medium P conveyed to the inside of the printing media recycling apparatus 100 and determines whether a maximum of the thickness of the entire printing medium P is within a range of a value specified in advance (Act 202). If the maximum of the thickness of the entire printing medium P is outside the range of the specified value as a result of the determination (Yes in Act 202), the diverting-section-switching control section 76 controls the diverting section 18 to discharge the used printing medium P to the discharge tray 20 (Act 203). The specified value is a value determined on the basis of the fact that the thickness of a printing medium changes if the printing medium has a physical defect, for example, the printing medium is bent, torn, or creased.

If the maximum of the thickness of the entire printing medium P is within the range of the specified value (No in Act 202), the first scanner 16 executes two-sided scanning for the printing medium P (Act 204). If the user sets, in the execution of the decoloring processing, an image of a printing medium to be decolored to be stored, the processor 50 captures image data read by the first scanner 16 into the memory 64 and stores the image data therein. The processor 50 executes a decoloring execution determination program (the decoloring-processing-execution determining section 80) on the basis of the captured image data and determines propriety of the execution of the decoloring processing, i.e., whether the printing medium P is suitable for recycling (Act 206). On the other hand, if the user sets the decoloring processing to be forcibly executed in the first user operation (Yes in Act 205), the processor 50 sets “necessary” in a decoloring processing determination flag in order to cause the printing media recycling apparatus 100 to always execute the decoloring processing for the printing medium P without performing the determination processing by the decoloring-processing-execution determining section 80 (Act 207)

Figure 5:
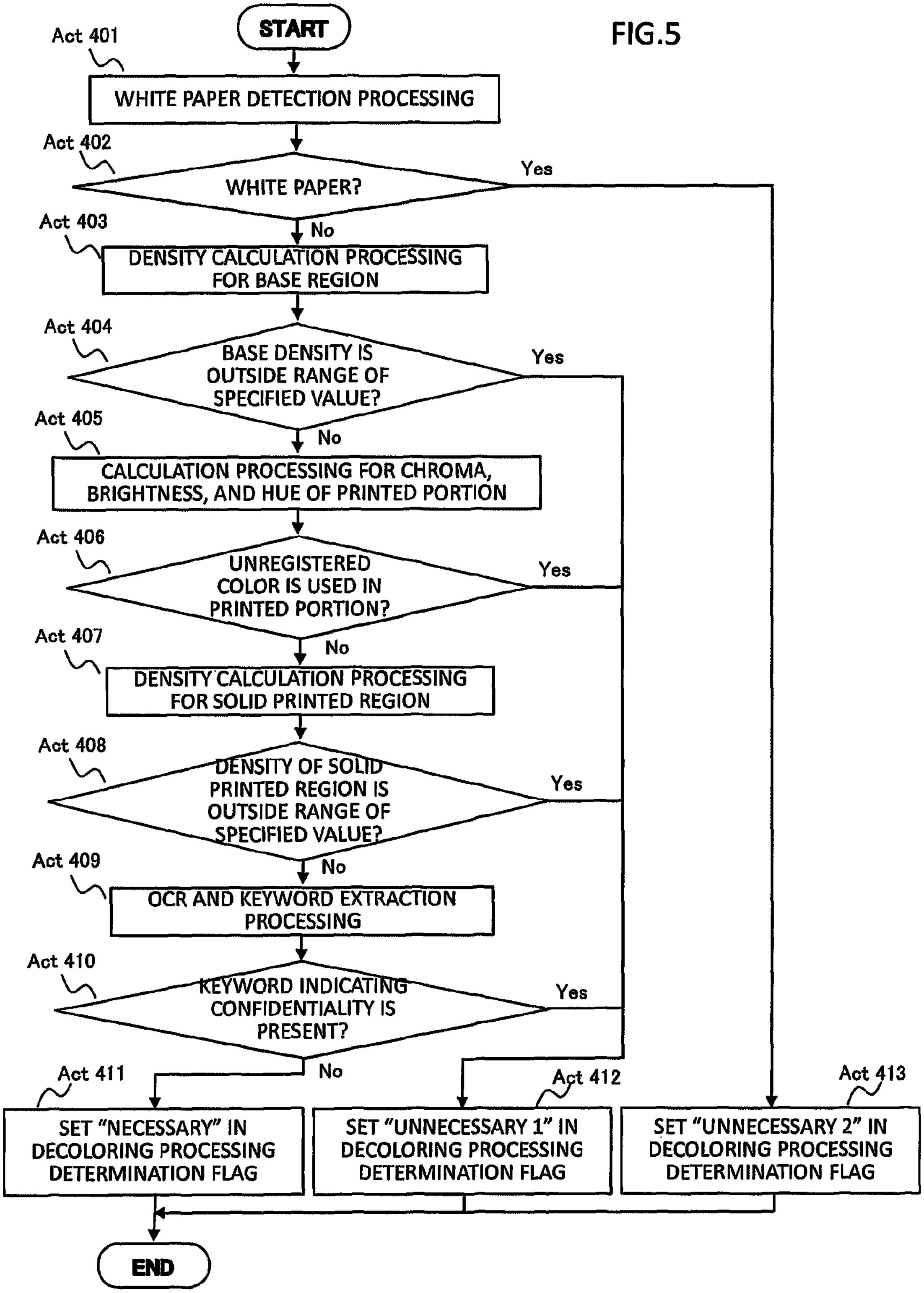
FIG. 5 is a flowchart for explaining a decoloring execution determination processing flow of the printing media recycling apparatus.

A determination flow of the decoloring execution determination program (the decoloring-processing-execution determining section 80) is explained with reference to FIG. 5.

The decoloring-processing-execution determining section 80 executes white paper detection processing on the basis of the image data captured into the memory 64 or the image data sent from the first scanner 16 (Act 401). If the decoloring-processing-execution determining section 80 determines that both sides of the printing medium P are blank (Yes in Act 402), the decoloring-processing-execution determining section 80 sets “unnecessary 2” in the decoloring processing determination flag (Act 413). This means that no printing image is present on the printing medium P and it is unnecessary to execute the decoloring processing.

If the decoloring-processing-execution determining section 80 determines in Act 402 that the printing medium P is not white paper (No in Act 402), the decoloring-processing-execution determining section 80 executes density calculation processing for a base region (Act 403). If the decoloring-processing-execution determining section 80 determines that there is no portion where the base density is outside a range of a specified value (No in Act 404), the decoloring-processing-execution determining section 80 executes calculation processing for chroma, brightness, and a hue of a printed portion of the printing medium P and calculates a printing color of a recording material used on the printing medium P (Act 405). The decoloring-processing-execution determining section 80 determines whether a recording material having a color other than a color registered in advance is used on the printing medium P (Act 406). If the decoloring-processing-execution determining section 80 determines that a recording material having a color other than the color registered in advance is not used (No in Act 406), the decoloring-processing-execution determining section 80 calculates the density of a solid printed region (a portion not subjected to the half-tone processing) (Act 407) and checks whether the calculated density of the solid printed region is outside the range of the specified value (Act 408). If the density of the solid printed region is within the range of the specified value (No in Act 408), the decoloring-processing-execution determining section 80 executes the OCR and keyword extraction processing (Act 409). The decoloring-processing-execution determining section 80 determines whether a keyword indicating a confidential document, for example, a keyword such as "confidential" or "company secret" is included in extracted keywords (Act 410). Keywords to be determined may be able to be arbitrarily set or may be able to be set for each user.

If the decoloring-processing-execution determining section 80 determines in Act 410 that a keyword indicating a confidential document is not included in the extracted keywords (No in Act 410), the decoloring-processing-execution determining section 80 sets "necessary" in the decoloring processing determination flag (Act 411). When "necessary" is set in the decoloring processing determination flag in this way (Yes in all Acts 404, 406, 408, and 410), this means that the used printing medium P is suitable for executing the decoloring processing in order to reuse the used printing medium P.

On the other hand, if there is a portion where the base density is outside the range of the specified value (Yes in Act 404), if a color other than the color registered in advance is used in the printed portion (Yes in Act 406), if there is a portion where the calculated density of the solid printed region is outside the range of the specified value (Yes in Act 408), or if a keyword indicating a confidential document is included in the keywords (Yes in Act 410), the decoloring-processing-execution determining section 80 sets "unnecessary 1" in the decoloring processing determination flag (Act 412). When "unnecessary 1" is set in the decoloring processing determination flag in this way, this means that the used printing medium P cannot be decolored even if the decoloring processing is applied to the used printing medium P or the used printing medium P is not suitable for decoloring and means that likelihood of reuse is low.

After setting any one of "unnecessary 1", "unnecessary 2", and "necessary" in the decoloring processing determination flag, the decoloring-processing-execution determining section 80 ends the decoloring processing execution determination flow.

Referring back to FIG. 4B, in Act 208, the processor 50 determines whether the decoloring processing determination flag set in the decoloring-processing-execution determining section 80 in Act 206 is "unnecessary 1". If a result of the determination is "unnecessary 1", the processor 50 determines that the used printing medium P is not suitable for reuse. The diverting-section-switching control section 76 controls the diverting section 18 to discharge the used printing medium P to the discharge tray 20 (Act 209)

On the other hand, if the processor 50 determines in Act 208 that the decoloring determination flag is not "unnecessary 1", subsequently, in Act 301, the processor 50 determines whether the decoloring determination flag is "unnecessary 2". If a result of the determination is "unnecessary 2", the processor 50 determines that the used printing medium P is white paper. The used printing medium P is reusable even if the decoloring processing is not performed. Therefore, the diverting-section-switching control section 76 controls the diverting sections 18 and 24 to select the conveying path 45 not passing through the heating decolorizer 26 and lead the used printing medium P directly to the discharge tray 36.

If the determination result is not "unnecessary 2" in Act 301, i.e., if the processor 50 determines that the decoloring processing determination flag is "necessary", in order to perform the decoloring processing, the diverting-section-switching control section 76 controls the diverting sections 18 and 24 to select the conveying path 44 passing through the heating decolorizer 26 (Act 302)

Subsequently, the processor 50 instructs heating of a heater of the heating decolorizer 26 (Act 304). The conveyance control section 72 conveys the used printing medium P to pass through the heating decolorizer 26. The processor 50 executes a series of the decoloring processing. The processor 50 causes the second scanner 28 to operate, reads an image of the used printing medium P subjected to the decoloring processing by the heating decolorizer 26, and captures image data (Act 305). The decoloring determining section 78 executes processing for determining, from the image data input thereto, whether a printed image of the used printing medium P is decolored (Act 306). If the decoloring determining section 78 determines that a decoloring residue is absent (No in Act 307), the diverting-section-switching control section 76 controls the diverting section 30 to lead the used printing medium P subjected to the decoloring processing to the discharge tray 36 (Act 309). On the other hand, if the decoloring determining section 78 determines in Act 307 that a decoloring residue is present (Yes in Act 307), the diverting-section-switching control section 76 controls the diverting section 30 to leads the used printing medium P subjected to the decoloring processing to the discharge tray 32 (Act 308)

Thereafter, the processor 50 confirms, using the sensors 22, 34, and 38, that the used printing medium P is discharged to the discharge tray 20, 32, or 36 (Act 310) and repeats the decoloring processing for the next used printing medium P until no printing medium P is left in the feeding tray 10.

As explained above, the printing media recycling apparatus 100 according to this embodiment determines possibility of reuse of the used printing medium P and necessity of the heating decoloring processing and appropriately switches the path passing through the heating decolorizer 26 (the conveying path 44) and the path not passing through the heating decolorizer 26 (the conveying path 45). Therefore, the printing media recycling apparatus 100 does not have to perform useless heating decoloring processing. It is possible to prevent deterioration of a printing medium and reduce waste of energy consumption due to unnecessary heating.

It is possible to discharge, using a shorter conveying path, a physically deteriorated printing medium and a printing medium unsuitable for reuse. Further, since the conveying paths can be linearly provided, it is possible to prevent occurrence of a jam as much as possible.

Second Embodiment

In a second embodiment, functional sections same as those in the first embodiment are denoted by the same reference numerals and explanation of the functional sections is omitted.

Figure 6:
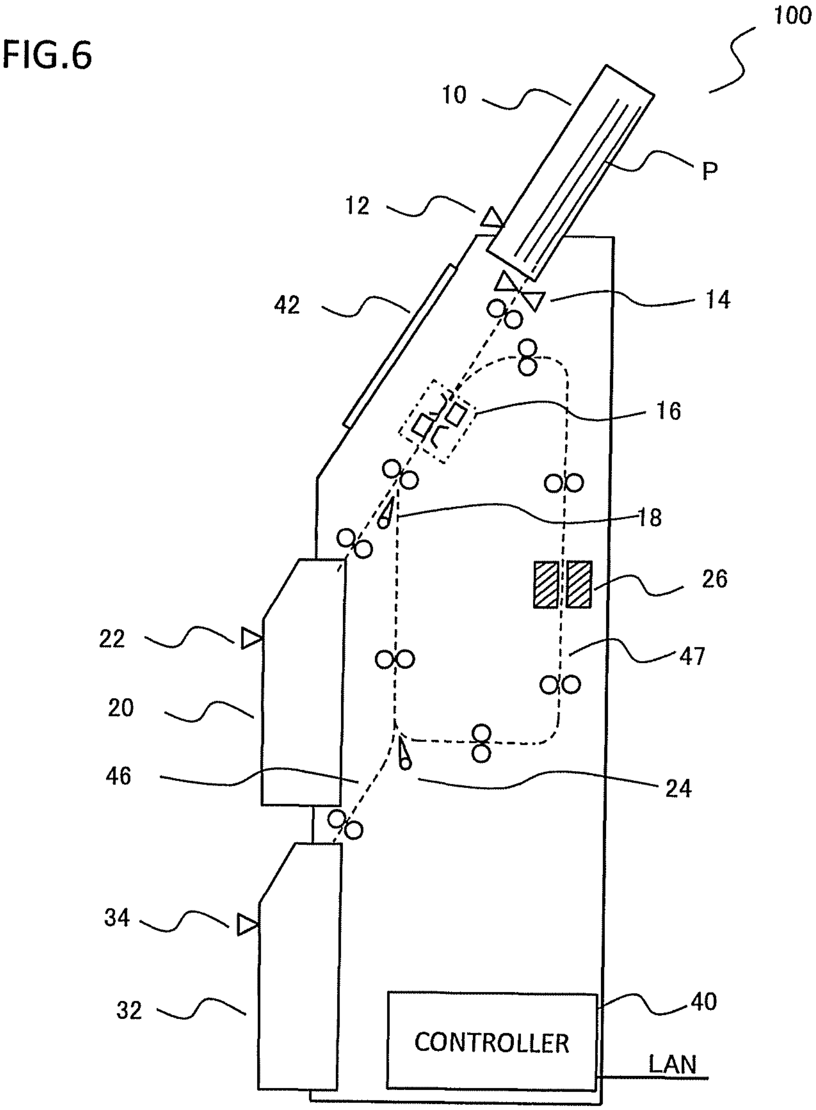
FIG. 6 is a diagram of the structure of a printing media recycling apparatus according to another embodiment.

FIG. 6 is a sectional view of the structure of the printing media recycling apparatus 100 according to the second embodiment. The printing media recycling apparatus 100 according to the second embodiment is simplified in a configuration by removing the second scanner 28, the discharge tray 36, and the diverting section 30 from the printing media recycling apparatus 100 according to the first embodiment. In the printing media recycling apparatus 100 according to the second embodiment, the first scanner 16 is substituted for the second scanner 28 used in the printing media recycling apparatus 100 according to the first embodiment. The discharge tray 20 is substituted for the discharge tray 32 used in the printing media recycling apparatus 100 according to the first embodiment.

A used printing medium determined as not suitable for recycling or a used printing medium determined as unsuitable for reuse after being subjected to decoloring processing because, for example, decoloring is insufficient is discharged to the discharge tray 20. An unused printing medium or a used printing medium determined as reusable after being subjected to the decoloring processing is discharged to the discharge tray 32.

The printing media recycling apparatus 100 according to the second embodiment includes an annular conveying path. The annular conveying path includes the first scanner 16 and the heating decolorizer 26 arranged in a conveying path 47. When the decoloring processing is executed, the diverting-section-switching control section 76 controls the diverting section 24 to lead a used printing medium to the conveying path 47. The printing-medium-conveyance control section 72 controls the used printing medium to pass through the heating decolorizer 26. The printing-medium-conveyance control section 72 returns the used printing medium passed through the heating decolorizer 26 to the first scanner 16 through the annular conveying path.

The operation of the printing media recycling apparatus 100 according to the second embodiment is explained.

The used printing medium P stored in the feeding tray 10 is conveyed to the inside of the printing media recycling apparatus 100 under the control by the printing-medium-conveyance control section 72. Two-sided scanning for the conveyed used printing medium P is executed by the first scanner 16. The processor 50 executes the decoloring execution determination program (the decoloring-processing-execution determining section 80) and determines propriety of the execution of the decoloring processing, i.e., whether the used printing medium P is suitable for recycling.

If the conveyed used printing medium P is determined as "unnecessary 1" by the decoloring-processing-execution determining section 80, the processor 50 determines that the used printing medium P is unsuitable for reuse. The diverting-section-switching control section 76 controls the diverting section 18 to discharge the used printing medium P to the discharge tray 20.

If the conveyed used printing medium P is determined as "unnecessary 2" by the decoloring-processing-execution determining section 80, the used printing medium P is white paper and can be reused even if the decoloring processing is not performed. Therefore, the diverting-section-switching control section 76 controls the diverting sections 18 and 24 to select the conveying path 46 not passing through the heating decolorizer 26 and discharges the used printing medium P directly to the discharge tray 32.

If the conveyed used printing medium P is determined as "necessary" by the decoloring-processing-execution determining section 80, the used printing medium P is subjected to the decoloring processing. Therefore, the diverting-section-switching control section 76 controls the diverting sections 18 and 24 to select the conveying path 47 passing through the heating decolorizer 26 and leads the used printing medium P to the annular conveying path.

The used printing medium P subjected to the decoloring processing is returned to a conveying path extending from the paper-feeding tray 10 upstream of the first scanner 16 through the annular conveying path. Decoloring determination by the decoloring determining section 78 is performed.

The processor 50 causes the first scanner 16 to operate again. The decoloring determining section 78 executes processing for determining, from input image data, whether a printed image of the used printing medium P is decolored. If the decoloring determining section 78 determines that a decoloring residue is present, the diverting-section-switching control section 76 controls the diverting section 18 to lead the used printing medium P to the discharge tray 20. On the other hand, if the decoloring determining section 78 determines that a decoloring residue is absent, the diverting-section-switching control section 76 controls the diverting sections 18 and 24 to lead the used printing medium P to the discharge tray 32 via the conveying path 46.

If the sensor 14 detects that a maximum of the thickness of the used printing medium P is outside a range of a specified value, the processor 50 switches the diverting section 18 to discharge the used printing medium P directly to the discharge tray 20 without executing the decoloring processing execution determination by the first scanner 16.

If a user sets the decoloring processing to be forcibly executed, the processor 50 sets a decoloring processing execution flag to "necessary" to cause the printing media recycling apparatus 100 to always execute the decoloring processing for the used printing medium P without executing the decoloring processing execution determination by the first scanner 16. The diverting-section-switching control section 76 controls the diverting sections 18 and 24 to lead the used printing medium P to the conveying path 47 and causes the heating decolorizer 26 to forcibly execute the decoloring processing.

As explained above, like the printing media recycling apparatus 100 according to the first embodiment, the printing media recycling apparatus 100 according to the second embodiment includes the path passing through the heating decolorizer 26 (the conveying path 47) and the path not passing through the heating decolorizer 26 (the conveying path 46). The printing media recycling apparatus 100 can determine whether heating decoloring processing is necessary and control the diverting sections 18 and 24 to convey the used printing medium P to an appropriate path. Consequently, the printing media recycling apparatus 100 does not have to perform useless heating decoloring processing. It is possible to prevent deterioration of a printing medium and reduce waste of energy consumption due to unnecessary heating. The configuration of the printing media recycling apparatus 100 is simplified. The cost of the printing media recycling apparatus 100 can be reduced.

In the embodiments, the examples of the decoloring processing execution determination include the base density detection processing, the printing color detection processing, the solid printing density detection processing, and the OCR and keyword extraction processing. However, the decoloring processing execution determination is not limited to these kinds of processing. It is also possible to detect the density and the area of an image printed with a decolorable recording material and, if an image with a low decoloring effect is detected even if the decoloring processing is executed, determine that decoloring is inappropriate.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A printing media recycling apparatus, comprising:

a printing-medium feeding section configured to feed a recycling target printing medium to a conveying path;

a scanner section configured to read an image of the printing medium conveyed on the conveying path and generate image data, the scanner section being arranged on the conveying path;

a decoloring section configured to heat the printing medium conveyed on the conveying path to execute decoloring processing for an image formed of a decolorable recording material on the printing medium, the decoloring section being arranged downstream from the scanner section on the conveying path;

a decoloring-processing-execution determining section configured to determine, on the basis of the image data generated by the scanner section, whether the execution of the decoloring processing is appropriate for the printing medium or the execution of the decoloring processing is unnecessary;

a decoloring determining section configured to determine a decolored state of the printing medium after the execution of the decoloring processing by the decoloring section; and a diverting-section-switching control section configured to switch, according to results of the determination by the decoloring-processing-execution determining section and the decoloring determining section, a diverting section to lead the printing medium to a predetermined discharge tray, wherein the decoloring-processing-execution determining section includes a base-density detecting section and, if the base-density detecting section determines that there is a portion where density of a base of the printing medium is outside a range of a specified value, determines that the execution of the decoloring processing is inappropriate.

2. The apparatus according to claim 1, wherein the diverting-section-switching control section switches the diverting section to select a conveying path passing through the decoloring section and a conveying path not passing through the decoloring section.

3. The apparatus according to claim 2, wherein the decoloring-processing-execution determining section includes a white-paper detecting section and, if the white-paper detecting section detects that the printing medium is white paper, selects the conveying path not passing through the decoloring section.

4. The apparatus according to claim 1, wherein the decoloring-processing-execution determining section includes a printing-color detecting section and, if the printing-color detecting section detects that a color other than a color registered in advance is used in a printed portion of the printing medium, determines that the execution of the decoloring processing is inappropriate.

5. The apparatus according to claim 1, wherein the decoloring-processing-execution determining section includes a solid-printing-density detecting section and, if the solid-printing-density detecting section detects that density outside a specified range is present in density of a solid printed portion of the printing medium, determines that the execution of the decoloring processing is inappropriate.

6. The apparatus according to claim 1, wherein the decoloring-processing-execution determining section includes an OCR and keyword extraction section and, if the OCR and keyword extraction section detects that a keyword indicating a confidential document or the like is included in the printing medium, determines that the execution of the decoloring processing is inappropriate.

7. The apparatus according to claim 1, wherein, if forced execution of the decoloring processing is set, the apparatus executes the decoloring processing for the printing medium without executing the determination by the decoloring-processing-execution determining section.

8. The apparatus according to claim 1, wherein the apparatus selects a shorter conveying path for the printing medium determined as unsuitable for the execution of the decoloring processing by the decoloring-processing-execution determining section than for the printing medium determined as suitable for execution of the decoloring processing and discharges the printing medium to the discharge tray.

9. The apparatus according to claim 1, wherein the decoloring determining section determines a decolored state of the printing medium after the execution of the decoloring processing on the basis of the image data generated by the scanner section.

10. A printing media recycling method, comprising:

feeding a recycling target printing medium to a conveying path;

a scanner section reading an image of the printing medium conveyed on the conveying path and generating image data, the scanner section being arranged on the conveying path;

a decoloring section heating the printing medium conveyed on the conveying path and executing decoloring processing for an image formed of a decolorable recording material on the printing medium, the decoloring section being arranged downstream from the scanner section on the conveying path;

a decoloring-processing-execution determining section determining, on the basis of the image data generated by the scanner section, whether the execution of the decoloring processing is appropriate for the printing medium or the execution of the decoloring processing is unnecessary;

a decoloring determining section determining a decolored state of the printing medium after the execution of the decoloring processing by the decoloring section; and a diverting-section-switching control section switching, according to results of the determination by the decoloring-processing-execution determining section and the decoloring determining section, a diverting section to lead the printing medium to a predetermined discharge tray, wherein the decoloring-processing-execution determining section includes a base-density detecting section and, if the base-density detecting section determines that there is a portion where density of a base of the printing medium is outside a range of a specified value, determines that the execution of the decoloring processing is inappropriate.

11. The method according to claim 10, wherein the diverting-section-switching control section switches the diverting section to select a conveying path passing through the decoloring section and a conveying path not passing through the decoloring section.

12. The method according to claim 11, wherein the decoloring-processing-execution determining section includes a white-paper detecting section and, if the white-paper detecting section detects that the printing medium is white paper, selects the conveying path not passing through the decoloring section.

13. The method according to claim 10, wherein the decoloring-processing-execution determining section includes a printing-color detecting section and, if the printing-color detecting section detects that a color other than a color registered in advance is used in a printed portion of the printing medium, determines that the execution of the decoloring processing is inappropriate.

14. The method according to claim 10, wherein the decoloring-processing-execution determining section includes a solid-printing-density detecting section and, if the solid-printing-density detecting section detects that density outside a specified range is present in density of a solid printed portion of the printing medium, determines that the execution of the decoloring processing is inappropriate.

15. The method according to claim 10, wherein the decoloring-processing-execution determining section includes an OCR and keyword extraction section and, if the OCR and keyword extraction section detects that a keyword indicating a confidential document or the like is included in the printing medium, determines that the execution of the decoloring processing is inappropriate.

16. The method according to claim 10, further comprising executing, if forced execution of the decoloring processing is set, the decoloring processing for the printing medium without executing the determination by the decoloring-processing-execution determining section.

17. The method according to claim 10, further comprising selecting a shorter conveying path for the printing medium determined as unsuitable for the execution of the decoloring processing by the decoloring-processing-execution determining section than for the printing medium determined as suitable for execution of the decoloring processing and discharges the printing medium to the discharge tray.

18. The method according to claim 10, wherein the decoloring determining section determines a decolored state of the printing medium after the execution of the decoloring processing on the basis of the image data generated by the scanner section.

* * * * *